United States Patent
Bartsch et al.

(10) Patent No.: US 12,170,655 B2
(45) Date of Patent: Dec. 17, 2024

(54) MICROCONTROLLER

(71) Applicant: WIZnet Germany GmbH, Kleinniedsheim (DE)

(72) Inventors: Witali Bartsch, Leverkusen (DE); Steen Harbach, Leverkusen (DE)

(73) Assignee: WIZnet Germany GmbH, Kleinniedesheim (DE)

( * ) Notice: Subject to any disclaimer, the term of this patent is extended or adjusted under 35 U.S.C. 154(b) by 531 days.

(21) Appl. No.: 17/298,186

(22) PCT Filed: Nov. 25, 2019

(86) PCT No.: PCT/EP2019/082363
§ 371 (c)(1),
(2) Date: May 28, 2021

(87) PCT Pub. No.: WO2020/114814
PCT Pub. Date: Jun. 11, 2020

(65) Prior Publication Data
US 2022/0116384 A1   Apr. 14, 2022

(30) Foreign Application Priority Data
Dec. 3, 2018   (EP) .................................. 18209811

(51) Int. Cl.
*G06F 7/04*   (2006.01)
*H04L 9/40*   (2022.01)

(52) U.S. Cl.
CPC ...... *H04L 63/0823* (2013.01); *H04L 63/0435* (2013.01); *H04L 63/083* (2013.01);
(Continued)

(58) Field of Classification Search
CPC ............. H04L 63/0823; H04L 63/0435; H04L 63/083; H04L 63/0876; H04L 63/166;
(Continued)

(56) References Cited

U.S. PATENT DOCUMENTS 6,981,147 B1   12/2005   Hamann et al.
9,544,298 B2   1/2017    Falk et al.
(Continued)

FOREIGN PATENT DOCUMENTS

DE   19961151 A1   8/2000
EP   0456386 A2    11/1991
EP   2593897 B1    2/2018

OTHER PUBLICATIONS

Chulde et al, Internet of Things Implementation with Nodes based on Low-Power Microcontroller MSP430, 2017, IEEE, pp. 33-40. (Year: 2017).*

(Continued)

*Primary Examiner* — Philip J Chea
*Assistant Examiner* — Jenise E Jackson
(74) *Attorney, Agent, or Firm* — The Webb Law Firm

(57) ABSTRACT

The present disclosure relates to a microcontroller comprising a memory module for storing a digital certificate, a network module for establishing a connection with a network, and a processor. The processor is configured to establish a connection with a network computer located in the network, to request a digital certificate from the network computer, to receive the digital certificate from the network computer, to store the digital certificate in the memory module, and to exchange user data with the network computer, provided that a previous verification of the digital certificate of the microcontroller has been successful. The present disclosure further relates to a method for communication between a microcontroller and a network computer as well as to a network computer and a communication system.

8 Claims, 8 Drawing Sheets

(52) U.S. Cl.
CPC ........ *H04L 63/0876* (2013.01); *H04L 63/166* (2013.01); *H04L 63/20* (2013.01)

(58) Field of Classification Search
CPC ......... H04L 63/20; H04L 9/08; H04L 9/3221; H04L 9/3268; H04W 12/04; H04W 12/0471; H04W 12/069
See application file for complete search history.

(56) References Cited

U.S. PATENT DOCUMENTS

| | | | | |
|---|---|---|---|---|
| 10,536,436 | B1* | 1/2020 | Barbour | H04L 63/0838 |
| 2005/0149733 | A1* | 7/2005 | Catherman | G06F 21/602 |
| | | | | 713/175 |
| 2005/0228886 | A1 | 10/2005 | Cain et al. | |
| 2015/0149781 | A1* | 5/2015 | Logue | H04W 60/00 |
| | | | | 713/168 |
| 2015/0222621 | A1* | 8/2015 | Baum | H04L 63/0807 |
| | | | | 726/9 |
| 2016/0335237 | A1* | 11/2016 | Alley | G09G 3/344 |
| 2017/0034284 | A1* | 2/2017 | Smith | H04L 9/0825 |
| 2017/0111333 | A1* | 4/2017 | Smith | H04W 12/04 |
| 2017/0126402 | A1* | 5/2017 | Medvinsky | H04L 9/0866 |
| 2017/0279631 | A1* | 9/2017 | Britt | H05B 6/668 |
| 2019/0158355 | A1* | 5/2019 | Ramisetty | H04L 63/0853 |
| 2020/0145409 | A1* | 5/2020 | Pochuev | H04L 63/0853 |

OTHER PUBLICATIONS

Abed, IoT: Architecture and Design, May 10, 2016, IEEE, pp. 1-3. (Year: 2016).*
Morozov et al, Hardware Key for Information Systems Users Authentication, IEEE, Feb. 28, 2004, pp. 420-421. (Year: 2004).*
Piska et al, A Java Card Based Approach for Smart Meter Gateway Security, IEEE, Nov. 13, 2013, pp. 1-5. (Year: 2013).*
"Amazon FreeRTOS", Amazon Web Services, Nov. 29, 2017, retrieved from https://web.archive.org/web/20180816060855/https://aws.amazon.com/freertos/, pp. 1-18.
"Amazon FreeRTOS Qualification Program Developer Guide", Amazon Web Services, Inc. and/or its affiliates, Jul. 31, 2018, retrieved from https://d1.awsstatic.com/product-marketing/iot/Amazon-FreeRTOS-Qualification-Program-Developer-Guide-V1.0.0.pdf, pp. 1-82.
"AWS IoT: IoT services for industrial, consumer, and commercial solutions", AWS IoT—Amazon Web Services, 2018, retrieved from https://aws.amazon.com/iot/, pp. 1-10.
"Azure IoT Services Reference Architecture", Mircrosoft, 2018, retrieved from https://aka.ms/iotrefarchitecture, pp. 1-2.
Berdy, "Device provisioning: Identity attestation with TPM", Nov. 2017, retrieved from https://azure.microsoft.com/de-de/blog/device-provisioning-identity-attestation-with-tpm/, pp. 1-7.
"Conceptual understanding of X.509 CA certificates in the IoT industry", Microsoft, Sep. 2017, retrieved from https://docs.microsoft.com/en-us/azure/iot-hub/iot-hub-x509ca-concept, pp. 1-12.
"Control access to IoT Hub", Microsoft, Jul. 2018, retrieved from https://docs.microsoft.com/en-us/azure/iot-hub/iot-hub-devguide-security, pp. 1-2.
Dierks, "The Transport Layer Security (TLS) Protocol: Version 1.2", Network Working Group, Aug. 2008, retrieved from https://tools.ietf.org/html/rfc5246, pp. 1-104.
Fielding, "Architectural Styles and the Design of Network-based Software Architectures", University of California, Irvine, 2000, retrieved from https://www.ics.uci.edu/_fielding/pubs/dissertation/top.htm, pp. 1-180.

"Get started with Key Vault certificates", Microsoft, 2018, retrieved from https://docs.microsoft.com/en-us/azure/sql-database/transparent-data-encryption-byok-azure-sql, pp. 1-13.
"Getting Started with FreeRTOS", Amazon, 2018, retrieved from https://aws.amazon.com/freertos/getting-started/, pp. 1-5.
Kagermann, "Recommendations for implementing the strategic initiative Industrie 4.0", National Academy of Science and Engineering, Apr. 2013, pp. 1-82.
Kocher et al., "Spectre Attacks: Exploiting Speculative Execution", 40th IEEE Symposium on Security and Privacy, 2019, pp. 1-20.
Lee, "Cyber Physical Systems: Design Challenges", Electrical Engineering and Computer Sciences, University of California at Berkeley, Jan. 23, 2008, pp. 1-10.
Leong et al., "Magic Quadrant for Cloud Infrastructure as a Service", Gartner, Aug. 19, 2013, pp. 1-25.
Lipp et al., "Meltdown: Reading Kernel Memory from User Space", Usenix: The Advanced Computing Systems Association, Aug. 15-17, 2018, pp. 973-990.
"Mitmproxy", retrieved from https://mitmproxy.org, May 5, 2011, pp. 1-4.
"Mitmproxy/mitmproxy", retrieved from https://hub.docker.com/r/mitmproxy/mitmproxy/, accessed Jun. 11, 2021, pp. 1-4.
"MS500 sS2E Module: User Manual", 2018, retrieved from https://www.pointblank.de/en/iot-security.html?file=files/assets/downloads/MS500, pp. 1-23.
Nemec et al., "The Return of Coppersmith's Attack: Practical Factorization of Widely Used RSA Moduli", ACM Conference on Computer and Communications Security (CCS), Oct. 30-Nov. 3, 2017, pp. 1631-1648.
"Provisioning devices with Azure IoT HubDevice Provisioning Service", Microsoft, May 2017, retrieved from https://docs.microsoft.com/en-us/azure/iot-dps/about-iot-dps, pp. 1-6.
"Report on Microsoft Windows 8 and TPM", German Federal Office for Information Security, Aug. 21, 2013, pp. 1-2.
"Security for Internet-enabled Products "Made in Germany"", Microsoft, 2018, retrieved from https://www.pointblank.de/de/?file=files/assets/downloads/PointBlank-Security, pp. 1-8.
Skorobogatov, "Copy Protection in Modern Microcontrollers", 2000, retrieved from https://www.cl.cam.ac.uk/~sps32/mcu_lock.html, pp. 1-12.
"Support additional protocols for IoT Hub", Microsoft, Nov. 2017, retrieved from https://docs.microsoft.com/en-us/azure/iot-hub/iot-hub-protocol-gateway pp. 1-3.
Vasters, "Service Assisted Communication' for Connected Devices", Microsoft, Feb. 9, 2014, retrieved from https://docs.microsoft.com/en-us/archive/blogs/clemensv/service-assisted-communication-for-connected-devices, pp. 1-19.
"Understand and use Azure IoT Hub SDKs", Microsoft, Mar. 2018, retrieved from https://web.archive.org/web/20180926112127/https://docs.microsoft.com/en-us/azure/iot-hub/iot-hub-devguide-sdks, pp. 1-5.
"What is Azure Active Directory?", Microsoft, 2018, retrieved from https://docs.microsoft.com/en-us/azure/active-directory/fundamentals/active-directory-whatis, pp. 1-4.
"What is Azure Key Vault?" Microsoft, 2018, retrieved from https://web.archive.org/web/20180107225504/https://docs.microsoft.com/en-US/azure/key-vault/key-vault-whatis, pp. 1-4.
"Windows Subsystem for Linux Documentation", Microsoft, Jul. 10, 2016, retrieved from https://docs.microsoft.com/en-us/azure/active-directory/fundamentals/active-directory-whatis, pp. 1-2.
Wu, "SRP Protocol Design", 1998, retrieved from srp.stanford.edu/design.html, pp. 1-2.

* cited by examiner

| Request | Response | Details |

POST https://saas-iothub-7867d48b-ec34-4d48-b0a7-82f2c966daf5.azure-devices.net/devices/1hi0itk/messages/events?api-version=2018-06-30 HTTP/1.1

Connection        Keep-Alive
Accept            application/json
Authorization     SharedAccessSignature sr=saas-iothub-7867d48b-ec34-4d48-b0a7-82f2c966daf5.azure-devices.net%2Fdevices%2F1hi0itk&sig=YfexIHXzf7%2FdMdGokK875F3tM5ht3gqnFfsCuKhLDvc%3D&se=1533305347
User-Agent        Microsoft.Azure.Devices.Client/1.17.1 (.Net Core 4.6.26614.01; Microsoft Windows 10.0.17134; X64)
Content-Length    86
Host              saas-iothub-7867d48b-ec34-4d48-b0a7-82f2c966daf5.azure-devices.net {
"humidity": 64.024097832862234,
"presssure": 577.03514568369961,
"temp": 67.275905398314787
}

Fig. 7

MICROCONTROLLER

CROSS-REFERENCE TO RELATED APPLICATIONS

This application is the United States national phase of International Application No. PCT/EP2019/082363 filed Nov. 25, 2019, and claims priority to European Patent Application No. 18209811.1 filed Dec. 3, 2018, the disclosures of which are hereby incorporated by reference in their entirety.

BACKGROUND

Field of the Invention

The present disclosure relates to a microcontroller for controlling an electric and/or an electronic device and a method for communication between a microcontroller and a network computer. The present disclosure further relates to a corresponding network computer and a communication system comprising a microcontroller and a network computer.

Description of Related Art

Microcontrollers have become an indispensable part of our everyday life. Numerous electric and/or electronic everyday objects are nowadays controlled by microcontrollers. These include, for example, lamps and LEDs, washing machines and dryers, radiators or radiator control valves, televisions, video recorders and DVD players.

Microcontrollers usually have at least one processor and one or more memory modules.

For many of the electric and/or electronic devices mentioned above, it is desirable that they can also be controlled remotely. For this purpose, corresponding microcontrollers comprise a network module for connecting the microcontroller to a network. The network module can in particular be a LAN module, a WLAN module or a mobile radio module, wherein the mobile radio module can comprise a GSM, GPRS, EDGE, UMTS and/or an LTE module in particular.

Providing a microcontroller with a network module opens up numerous new application possibilities. For example, using a microcontroller with a network module makes it possible to network conventional household appliances and control them conveniently from a smartphone. For example, a radiator in an apartment can be switched on as needed while on the way by using a corresponding app. In addition, a radiator can be controlled automatically depending on an outdoor temperature measured by a thermometer. Electric shutters can also be controlled depending on the currently set parameters of a radiator located in a shared network.

It is therefore not surprising that providing microcontrollers with network modules has contributed to the rapid development in the field of smart home technology.

Likewise, the development in the field of IoT (Internet of Things) as well as in the field of Industry 4.0 is spurred by modern microcontrollers with integrated network modules.

Due to the increasing number of electric and/or electronic devices that are interconnected via a network, the question of how to achieve secure and efficient communication between several microcontrollers and a network computer located in a shared network is increasingly raised.

In this context, a central aspect for secure communication is the use of digital certificates through which an authentication between a microcontroller and a network computer is possible. A digital certificate particularly includes a digital authentication key by means of which the identity of a first communication partner can be checked by a second communication partner. This prevents, for example, an unauthorized outsider from sending control commands to a microcontroller and thus gaining control of one or more electric and/or electronic components.

Digital certificates are generally known. The use of digital certificates is described in connection with the communication between two computers in EP 2 593 897 B1, for example. The cited publication discloses a method in which a first subscriber authenticates itself to a second subscriber with a digital certificate. The certificate has one or more features that need to be fulfilled by the second subscriber. The cited publication does not specify in detail how the first subscriber is provided with a certificate.

SUMMARY OF THE INVENTION

For a microcontroller to be able to communicate with a network computer, the microcontroller must first receive a digital certificate tailored to it. In principle, various possibilities are conceivable for this.

One possibility would be for the microcontroller manufacturer to create a digital certificate for each microcontroller and to store this certificate in the memory module of the microcontroller. The disadvantage of this is that the data concerning the digital certificate of the microcontroller are known by the manufacturer. A hacker attack on the IT systems of the manufacturer could lead to sensitive data about the microcontroller being stolen and misused by unauthorized persons.

Another possibility for issuing a digital certificate would be to provide each individual microcontroller with a digital certificate via an externally decoupled connection. For this purpose, a portable computer could be used, for example, which establishes a wired connection with the microcontroller, issues a digital certificate for the microcontroller and transmits the digital certificate to the microcontroller. The microcontroller is thus provided with a digital certificate from close range. The advantage of this method would be that the microcontroller manufacturer would not have any information about the digital certificate or any authentication key of the microcontroller. However, a disadvantage of this method would be that an employee would have to go to each individual microcontroller with the portable computer in order to provide each individual microcontroller with a digital certificate. Particularly if numerous microcontrollers are to be provided with digital certificates, this alternative possibility is very time-consuming and costly and is therefore not particularly suitable. In addition, the use of a portable computer would inevitably also mean that the root key required for issuing the certificates would also have to be carried on the portable computer. Such a measure would be a violation of the applicable operating principles of a root certificate authority, which must secure its root key in the best possible way at all times.

The above-described possibilities can be regarded as either insecure or inefficient.

Therefore, the object of the present disclosure is to provide a microcontroller for controlling an electric and/or electronic device as well as a corresponding method for communication between a microcontroller and a network computer which enable to efficiently and securely issue a digital certificate for a microcontroller. Accordingly, the object of the present disclosure is to provide a network computer as well as a communication system comprising a microcontroller and a network computer which enable to efficiently and securely issue a digital certificate for a microcontroller. The above-mentioned object is achieved by proposing a microcontroller, a method for communication between a microcontroller and a network computer, a network computer as well as a respective communication system according to the independent claims. Further advantageous embodiments of the present disclosure are defined in the subclaims.

In particular, the above-mentioned object is achieved by proposing a microcontroller for controlling an electric and/or an electronic device, comprising
  a memory module for storing a digital certificate;
  a network module for establishing a connection with a network; and
  a processor;
  characterized in that
  the processor is adapted
    to establish a connection with a network computer located in the network;
    to request a digital certificate from the network computer;
    to receive the digital certificate from the network computer;
    to store the digital certificate on the memory module;
    to send a verification request to the network computer; and
    to exchange user data with the network computer, provided that a previous verification of the digital certificate for the microcontroller has been successful.

The microcontroller according to the disclosure enables to efficiently and securely issue and allocate a digital certificate. Issuing and allocating the digital certificate is particularly secure in that the microcontroller manufacturer does not have any information about the digital certificate or about any authentication key. This minimizes the risk of sensitive data relating to the microcontroller falling into the wrong hands as a result of a hacker attack on the IT systems of the microcontroller manufacturer. The initial process of issuing the digital certificate is thus shifted from the microcontroller manufacturer to the network computer. Therefore, the user of the microcontroller can decide which security system is used in the network computer and is thus independent of the security measures of the microcontroller manufacturer. A further advantage of the microcontroller according to the disclosure is that several microcontrollers can be provided with digital certificates quasi-simultaneously, wherein the digital certificates are all generated via the same network computer and transferred to the microcontrollers. Thus, the effort required in the initial initiation or registration of the microcontrollers with respect to the network computer is reduced and thus efficiently issuing digital certificates is enabled. The request to the network computer for a digital certificate in the context of the present disclosure is to be understood as the processor being adapted to request the network computer for a new digital certificate. This describes the situation in which the microcontroller does not yet have a digital certificate. In other words, the processor of the microcontroller may be adapted to request the network computer to issue a certificate for the microcontroller.

The memory module as defined by the microcontroller according to the disclosure can particularly be a ROM, EPROM, EEPROM or a flash memory. The network module as defined by the microcontroller according to the disclosure can particularly be configured as a WLAN module or as one of the above-mentioned network modules. For example, a 16-bit or 32-bit processor from Intel or ARM can be used as the processor.

After the microcontroller has established a connection with the network computer and has received a digital certificate from the network computer, a secure communication between the microcontroller and the network computer is possible. This communication only takes place if the verification of the digital certificate of the microcontroller has been successful beforehand.

According to an embodiment of the microcontroller according to the disclosure, it can be advantageously provided that the processor is adapted to establish a secured connection with the network computer when the microcontroller is initiated. In the case of the secured connection, it can be provided, in particular, that the transmitted data are encrypted. By using a secured connection, the security is increased when issuing the digital certificate to the microcontroller. The risk than an unauthorized person requests a digital certificate from the network computer and also receives the digital certificate by the network computer is reduced by using a secured connection.

It may preferably be provided that the processor of the microcontroller according to the disclosure is adapted to establish the secured connection by using the Secure Remote protocol, SRP protocol. The SRP protocol will be explained in more detail in the context of the method according to the disclosure.

Furthermore, in a configuration of the microcontroller according to the disclosure, it may preferably be provided that the microcontroller comprises a display for displaying information. This allows the processor of the microcontroller to directly control the display.

It may be provided in a particularly preferred manner that the microcontroller comprises an E-INK display. This advantageous configuration of the disclosure can serve, for example, as an electronic price tag used in retail stores to easily and conveniently update prices of individual products.

Furthermore, it is considered self-evident in terms of the present disclosure that the processor of the microcontroller according to the disclosure may also be adapted to perform all steps disclosed in connection with the method according to the disclosure. It is also considered self-evident that the microcontroller according to the disclosure can have all the features which will be described in connection with the network computer or the communication system.

Furthermore, the above-mentioned object is achieved by proposing a method for communication between a microcontroller comprising a processor, a memory module and a network module, and a network computer comprising a processor, a memory module and a network module, the method according to the disclosure comprising the following steps:
  initiating the microcontroller, wherein initiating comprises the following steps:
    establishing a connection between the microcontroller and the network computer;
    requesting the network computer, by the microcontroller, for a digital certificate;
    issuing a digital certificate by the network computer;
    transmitting the digital certificate from the network computer to the microcontroller; and
    storing the digital certificate in the memory module of the microcontroller; and
  exchanging user data between the microcontroller and the network computer, wherein exchanging user data comprises the following steps:

establishing a connection between the microcontroller and the network computer;

verifying the digital certificate of the microcontroller by the network computer; and exchanging user data between the microcontroller and the network computer, provided that the previous verification of the digital certificate of the microcontroller by the network computer has been successful.

The aforementioned step of initiating the microcontroller comprises all steps that are performed until the microcontroller receives a digital certificate. This step can also be understood as an initial registration of a microcontroller in a network. Once this step is finished, the microcontroller is ready for communication with the network computer. As described above in connection with the microcontroller, the method step of requesting the network computer, by the microcontroller, for a digital certificate may be understood as requesting the network computer, by the microcontroller, for a new digital certificate. In other words, initiating the microcontroller can comprise the following step:

requesting the network computer, by the microcontroller, for a new digital certificate.

Alternatively, the aforementioned method step can be construed such that initiating the microcontroller comprises the following step:

requesting the network computer, by the microcontroller, to issue a digital certificate for the microcontroller.

The method according to the disclosure makes it possible to provide the microcontroller with a digital certificate without storing sensitive data, which are used to identify the microcontroller in the network, at the microcontroller manufacturer. The digital certificate is issued exclusively on the network computer. This gives the user of a network complete control over issuing digital certificates as well as over any other measures for securely storing the sensitive data, in particular the digital certificate or a digital authentication key.

After successful registration of the microcontroller in the network, a secure exchange of user data can take place between the microcontroller and the network computer, since the verification of the digital certificate of the microcontroller ensures that user data are only exchanged if the microcontroller also has the correct digital certificate. This minimizes the risk that unauthorized persons who do not have the appropriate digital certificate can exchange user data with the network computer.

According to an advantageous embodiment of the method according to the disclosure, it may be provided that a digital authentication key, which may be necessary for establishing a connection between the microcontroller and the network computer during the initiation process, is generated independently by the microcontroller without subsequent reading of the authentication key or its extraction being necessary or desired. The authentication key can be generated, for example, by a method for generating a random number or a random character. This particularly ensures that the authentication key never comes into the possession of the microcontroller manufacturer or another outsider and that, according to the random principle, prior or subsequent guessing of the authentication key is made considerably more difficult either in whole or in parts.

According to an embodiment of the method according to the disclosure, it may be provided that the microcontroller generates an authentication key and that it is subsequently verified via a zero-knowledge method by the network computer whether the microcontroller is in possession of a correct key. This may provide a method for zero-knowledge initial enrolment of a microcontroller with a network computer. According to an embodiment, it may be provided that the authentication key is provided by a random principle, in particular by generating a random number or a random character string.

According to an embodiment, it may be provided that a verification parameter is determined by the microcontroller, the verification parameter being calculated from the authentication key. In this respect, it may be provided that the verification parameter in transferred to the network computer and that the network computer checks the identity of the microcontroller by evaluating the verification parameter. This has the advantage that the authentication key never needs to be exchanged between the microcontroller and the network computer.

Further preferably, in a configuration of the method according to the invention, it may be provided that when a connection is established between the microcontroller and the network computer during initiation of the microcontroller, a secured connection is established. As already explained in connection with the microcontroller according to the disclosure, the use of a secured connection reduces the risk of unauthorized interception of the digital certificate during output to the microcontroller. In the secures connection, the exchanged information, for example an authentication key used for the initial initiation of the microcontroller (hereinafter also referred to as "first authentication key"), is transmitted in encrypted form. Both symmetric and asymmetric encryption methods can be used for encryption. In symmetric encryption, the same key is used for both encryption and decryption. In asymmetric encryption methods, a key pair is generated that consists of a private and a public key.

Asymmetric encryption methods generally offer more extensive security than symmetric encryption methods because, unlike symmetric methods, they do not rely on the simultaneous presence of what is therefore known as the symmetric secret key at both ends of a communication link that is to be secured. However, they are usually associated with a higher computing effort. According to the method of the disclosure, it may be provided that an authentication key is transmitted in encrypted form between the microcontroller and the network computer. Only when the authentication key of the microcontroller has been checked and the identity of the microcontroller has been verified by the network computer, the network computer will issue a digital certificate and transmit the digital certificate to the microcontroller. This ensures that no unauthorized person can come into the possession of the authentication key.

According to a further preferred embodiment of the method according to the disclosure, it may be provided that a zero-knowledge method is used when initiating the microcontroller. The zero-knowledge method is a method known from cryptography. The basic idea of this method is that a first communication partner can convince a second communication partner to be in possession of a secret (e.g. a key) without revealing this secret. In connection with the zero-knowledge method, one usually speaks of a prover (first communication partner) and a verifier (second communication partner). The prover is usually in possession of a secret and wants to convince the verifier of the possession of the secret. The verifier asks the prover several questions to find out whether the prover is actually in possession of the secret. If the prover answers the question correctly, the verifier can assume with a relatively high probability that the prover is actually in possession of the secret. In the context of the present disclosure, the secret is in particular is a first authentication key which the microcontroller can use to prove its identity to the network computer during the initiation process. The advantage of using the zero-knowledge method in the method according to the disclosure is that the first authentication key does not need to be transferred via the communication channel. According to an embodiment, it may be provided that only a verification parameter (also referred to as "verifier" in English), which may be used to verify the authentication key of the microcontroller, is transferred separately to the network computer. For example, it may be provided that the verification parameter of the microcontroller is sent to the network computer by the user or the prover via email. It may also be provided that several verification parameters of numerous microcontrollers are sent simultaneously to the network computer via email. However, it should be noted at this point that this should preferably be a secure form of email communication, such as in the case of PGP or S/MIME. Further preferably, it may be provided in a configuration of the method according to the disclosure that one or more verification parameters are uploaded using a secured central web application.

Furthermore, according to an advantageous embodiment of the method according to the disclosure, it may be provided that the step of initiating the microcontroller comprises the following steps:
  generating a first authentication key;
  establishing a connection between the microcontroller and the network computer;
  requesting the network computer, by the microcontroller, for a digital certificate;
  verifying the identity of the microcontroller by checking the first authentication key and using a zero-knowledge method;
  issuing a digital certificate, comprising a second authentication key, by the network computer and transmitting the digital certificate from the network computer to the microcontroller, provided that the previous verification of the identity of the microcontroller has been successful; and
  storing the digital certificate on the memory module of the microcontroller.

According to an advantageous embodiment of the method according to the disclosure, it may also be provided that the step of initiating the microcontroller comprises the following steps:
  generating a first authentication key
  generating a verification parameter;
  establishing a connection between the microcontroller and the network computer;
  requesting the network computer, by the microcontroller, for a digital certificate;
  verifying the identity of the microcontroller by the network computer, namely by checking the verification parameter received from the microcontroller;
  issuing a digital certificate, comprising a second authentication key, by the network computer and transmitting the digital certificate from the network computer to the microcontroller, provided that the previous verification of the identity of the microcontroller has been successful; and
  storing the digital certificate on the memory module of the microcontroller.

Preferably, the generation of the first and second authentication keys may be performed by a random principle. In particular, the first and second authentication keys can be generated by the microcontroller by generating a random number or a random character string.

For further configuration of the method according to the disclosure, it may be provided that a password-authenticated key agreement method, also known as PAKE method, is used in the zero-knowledge method. The PAKE method is a subgroup of the zero-knowledge methods. The PAKE method is known in cryptography and enables several communication partners to create cryptographic keys for secure communication based on a key available at one of the communication partners. An unauthorized person who eavesdrops on the communication channel between the communication partners cannot decrypt the encrypted information exchanged between the combination partners.

According to a particularly preferred embodiment of the method according to the disclosure, it may further be provided that Secure Remote Password protocol, also known as SRP protocol, is used when initiating the microcontroller.

The SRP protocol (hereinafter also referred to as SRP method) is a method known from cryptography which is used for password authentication. Even though the SRP method is known in different versions, in particular versions 3, 6 and 6a, the basic principle is identical in all versions. All of the aforementioned versions of the SRP protocol are suitable for the present method according to the disclosure. A major advantage of using the SRP protocol is that no third party, which must act as a trusted certificate authority, is necessary to verify the identity of a party. In the context of the method according to the disclosure, it may be provided, in particular, that the microcontroller first generates a user name, a first authentication key used during the initiation of the microcontroller, a salt (randomly chosen string) and a verification parameter (also referred to as "verifier" in English). The user name, the salt and the verification parameter are then transmitted to the network computer. The network computer can then verify the authenticity of the microcontroller by means of the transmitted information according to the SRP protocol. If the verification is successful, the network computer can issue and transmit a digital certificate to the microcontroller. The digital certificate that is subsequently used in the exchange of data between the microcontroller and the network computer can include, in particular, a second authentication key that is different from the first authentication key. While the first authentication key is used during the process of initiating the microcontroller, the second authentication key can be used during the process of exchanging data between the microcontroller and the network computer.

According to a further advantageous embodiment of the method according to the disclosure, it may also be provided that the step of initiating the microcontroller comprises the following steps:
  generating a first authentication key;
  establishing a connection between the microcontroller and the network computer;
  requesting the network computer, by the microcontroller, for a digital certificate;
  verifying the identity of the microcontroller by checking the first authentication key and using the SRP method;
  issuing a digital certificate, comprising a second authentication key, by the network computer and transmitting the digital certificate from the network computer to the microcontroller, provided that the previous verification of the identity of the microcontroller has been successful; and
  storing the digital certificate in the memory module of the microcontroller.

According to an embodiment of the method according to the disclosure it may further be provided that in the step of exchanging user data between the microcontroller and the network computer, which step is downstream of the initiation, an encrypted exchange is performed using the Transport Layer Security protocol, also known as TLS protocol. Using the TLS protocol enables increased security in the communication between the microcontroller and the network computer.

According to a further preferred embodiment of the method according to the disclosure, it may be provided that the TLS protocol uses a two-way TLS protocol in which both the digital certificate of the microcontroller is verified by the network computer and the digital certificate of the network computer is verified by the microcontroller. By verifying the corresponding digital certificates on both sides, the security of communication between the microcontroller and the network computer can be further increased.

In a further embodiment of the method according to the disclosure, it may further be provided that a firmware is additionally transferred from the network computer to the microcontroller and is installed on the microcontroller when the microcontroller is initiated. This enables particularly efficient and quasi-simultaneous delivery of application-specific firmware. Simultaneous output of the digital certificate and the firmware to the microcontroller also means that a microcontroller can be set up within a very short time. This is particularly advantageous if numerous microcontrollers are to be set up at the same time. In this way, the time required and the costs for implementing numerous microcontrollers in a network can be significantly reduced.

It is considered self-evident that the method according to the disclosure can also be combined with all features described herein in connection with the microcontroller, the network computer or the communication system according to the disclosure.

Furthermore, a network computer with a processor, a memory module and a network module is proposed for achieving the above-mentioned object, the processor being adapted to establish a connection with a microcontroller;
to issue a digital certificate;
to transmit the digital certificate to the microcontroller;
the verify the digital certificate of the microcontroller;
to exchange user data with the microcontroller, provided that the previous verification of the digital certificate of the microcontroller has been successful.

The network computer according to the disclosure makes it possible to issue digital certificates for microcontrollers in a particularly efficient and secure manner. According to an embodiment of the network computer according to the disclosure, an additional high-security module (also known as Hardware Security Module—HSM) for storing an authentication key may be provided. High-security modules are known in cryptography and enable efficient and secure execution of cryptographic operations. When using a high-security module, the sensitive keys can be stored in a separate, secured memory. This further increases the security of communication between the microcontroller and the network computer.

It is considered self-evident that the network computer according to the disclosure can be combined with all features described in connection with the microcontroller according to the disclosure, the method or the communication system according to the disclosure.

Finally, a communication system is proposed for achieving the above-mentioned object, comprising the above-described microcontroller according to the disclosure and the above-described network computer according to the disclosure. It is also taken for granted that the communication system according to the disclosure may comprise all features described in connection with the microcontroller according to the disclosure, the method or the network computer according to the disclosure.

BRIEF DESCRIPTION OF THE DRAWINGS

In the following, the disclosure is described in more detail by means of exemplary embodiments and with reference to the drawings, in which:

FIG. 7 shows intercepted Azure IoT traffic.

DETAILED DESCRIPTION OF THE INVENTION

Figure 1:
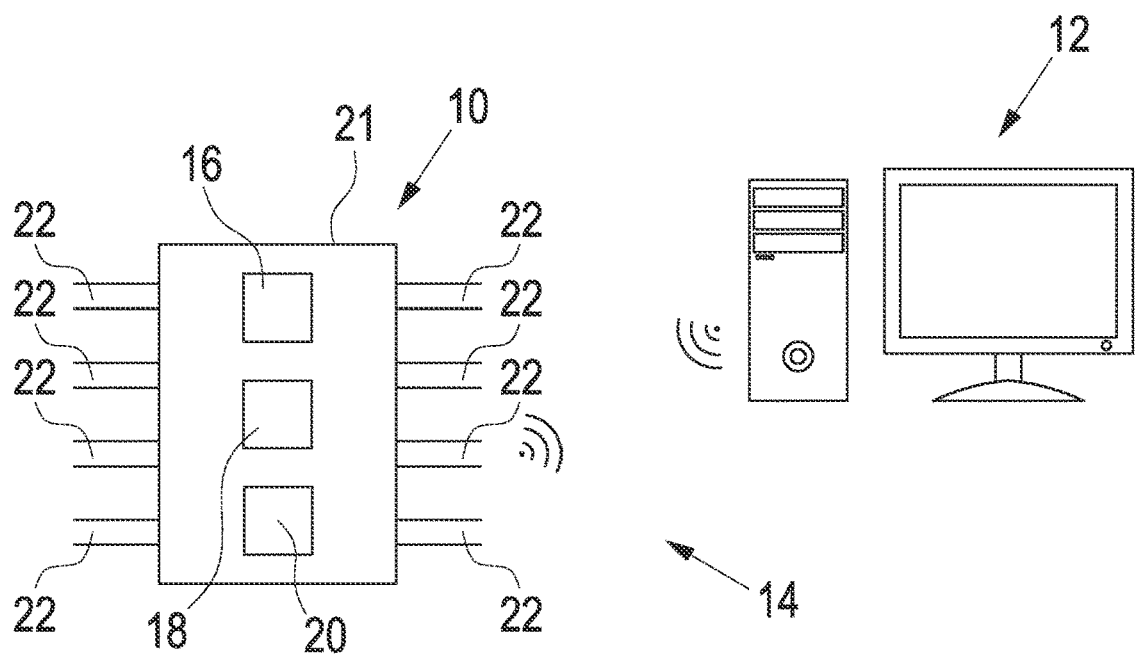
FIG. 1 shows a schematic diagram of an embodiment of the microcontroller and the network computer according to the disclosure.

FIG. 1 schematically shows an embodiment of microcontroller 10 according to the disclosure. Microcontroller 10 is adapted to communicate with network computer 12 according to the disclosure. In particular, it may be provided that network computer 12 can send control commands to microcontroller 10. Microcontroller 10 and network computer 12 together form communication system 14 according to the disclosure.

Microcontroller 10 has a memory module 16 for storing a digital certificate. Memory module 16 can be configured as a flash or EEPROM memory in particular. Furthermore, microcontroller 10 comprises a network module 18 for establishing a connection with a network. Network module 18 can be configured as a WLAN module in particular. Furthermore, microcontroller 10 comprises a processor 20. Processor 20 is adapted to establish a connection with network computer 12, to request network computer 12 for a digital certificate, to receive and store the digital certificate in memory module 16, and to exchange data with network computer 12, provided that a previous verification of the digital certificate of microcontroller 10 has been successful. Memory module 16, network module 18 and processor 20 are arranged in a microcontroller housing 21. Furthermore, microcontroller 10 comprises connection lines 22 for connecting microcontroller 10 to a printed circuit board and/or to further components. Network computer 12 also comprises a memory module, a network module and a processor, which, however, are not separately illustrated in FIG. 1.

Figure 2:
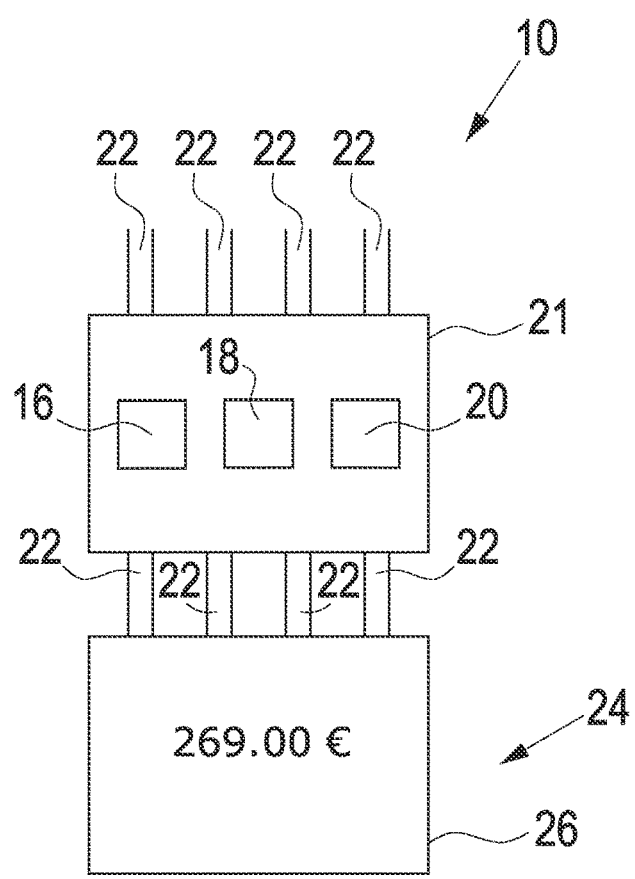
FIG. 2 shows a schematic diagram of a further embodiment of the microcontroller according to the disclosure comprising a display.

FIG. 2 shows a further embodiment of microcontroller 10 according to the disclosure. According to the embodiment shown in FIG. 2, microcontroller 10 comprises a display 24. In this exemplary embodiment, display 24 is configured as an E-ink display 26. Microcontroller housing 21 is connected with display 24 by means of connection lines 22. The microcontroller 10 illustrated in this exemplary embodiment can be used to display prices in a department store. By connecting microcontroller 10 to a network computer 12, the price of goods can be easily and conveniently updated without requiring an employee to replace a price tag.

Figure 3:
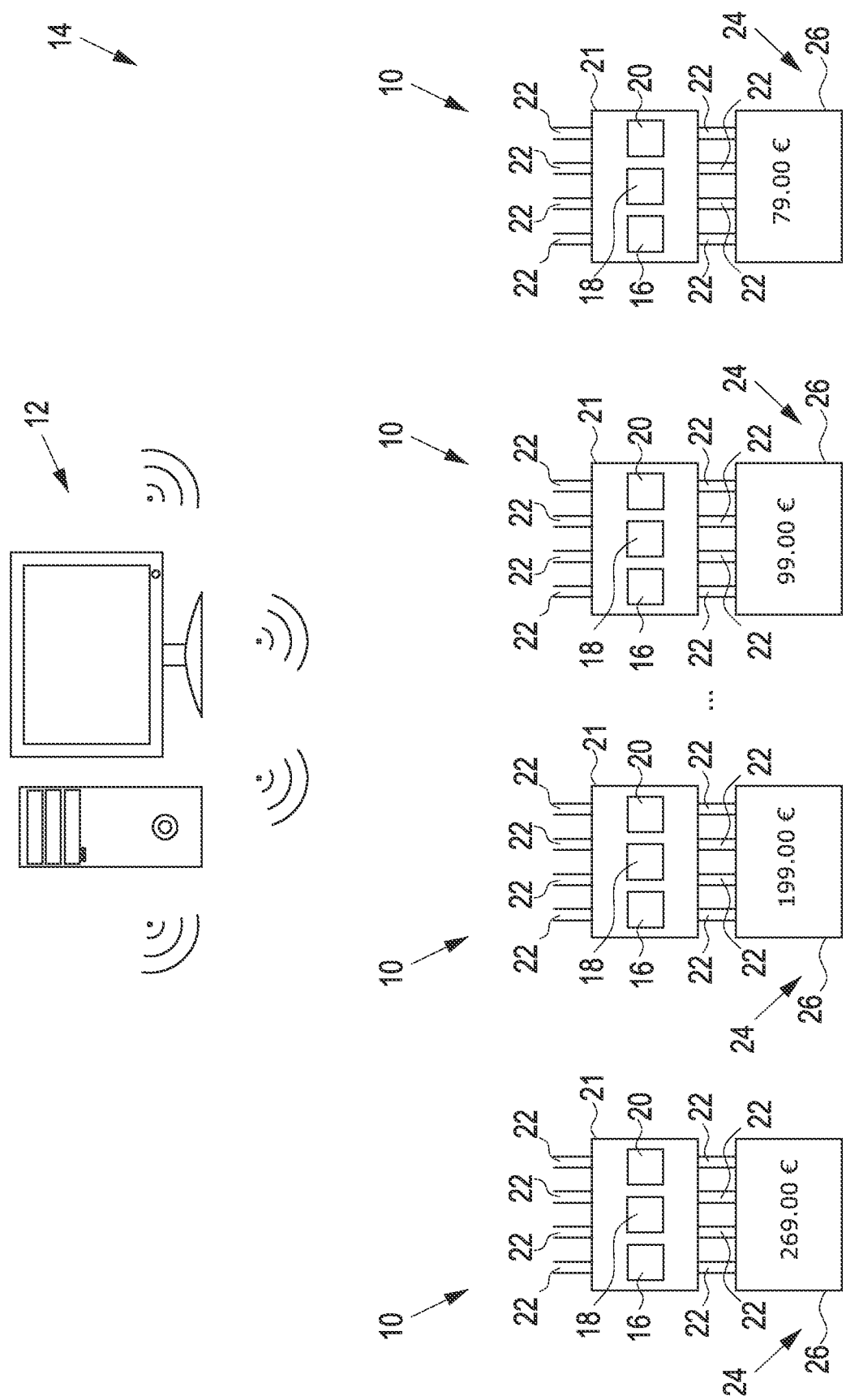
FIG. 3 shows a schematic diagram of a further embodiment of the disclosure comprising several microcontrollers according to the disclosure.

FIG. 3 shows several microcontrollers 10 each provided with a display 24. All of the microcontrollers 10 are connected to a network computer 12, therefore network computer 12 can centrally manage all of the prices displayed on the displays 24 and update the prices as needed. In this way, for example, all of the price tags in a department store can be controlled by one and the same network computer 12. This ensures efficient control of numerous electronic price tags in a department store.

Figure 4:
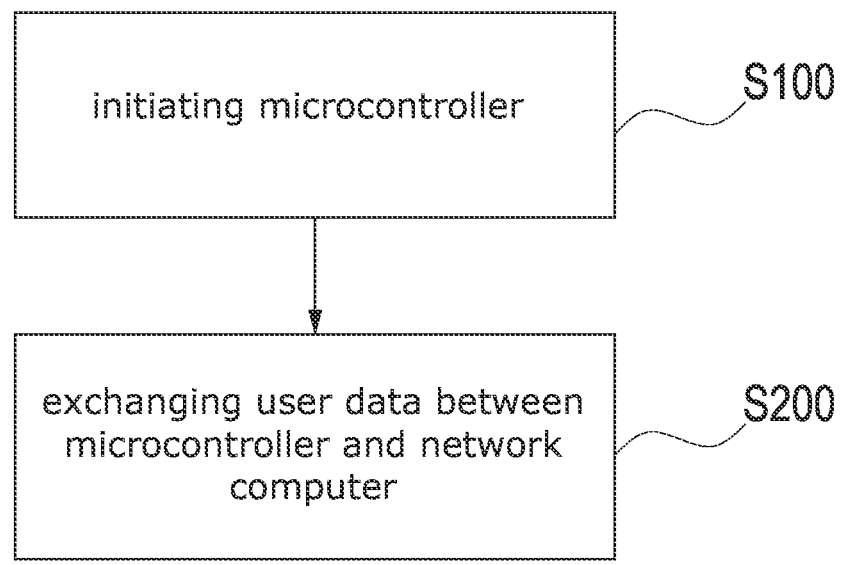
FIG. 4 shows a flow diagram for illustrating the subordinate step of the method according to the disclosure.

Furthermore, FIG. 4 shows an overview of the subordinate method steps of initiation S100 of the microcontroller and the subsequent exchange of user data S200. According to the method of the disclosure, the first step is to prepare the microcontroller for communication with network computer 12. This preparation proceeds within initiation step S100. After initiation S100 is completed, microcontroller 10 is prepared for communication with network computer 12, so that the exchange S200 of user data between microcontroller 10 and network computer 12 can take place.

Figure 5:
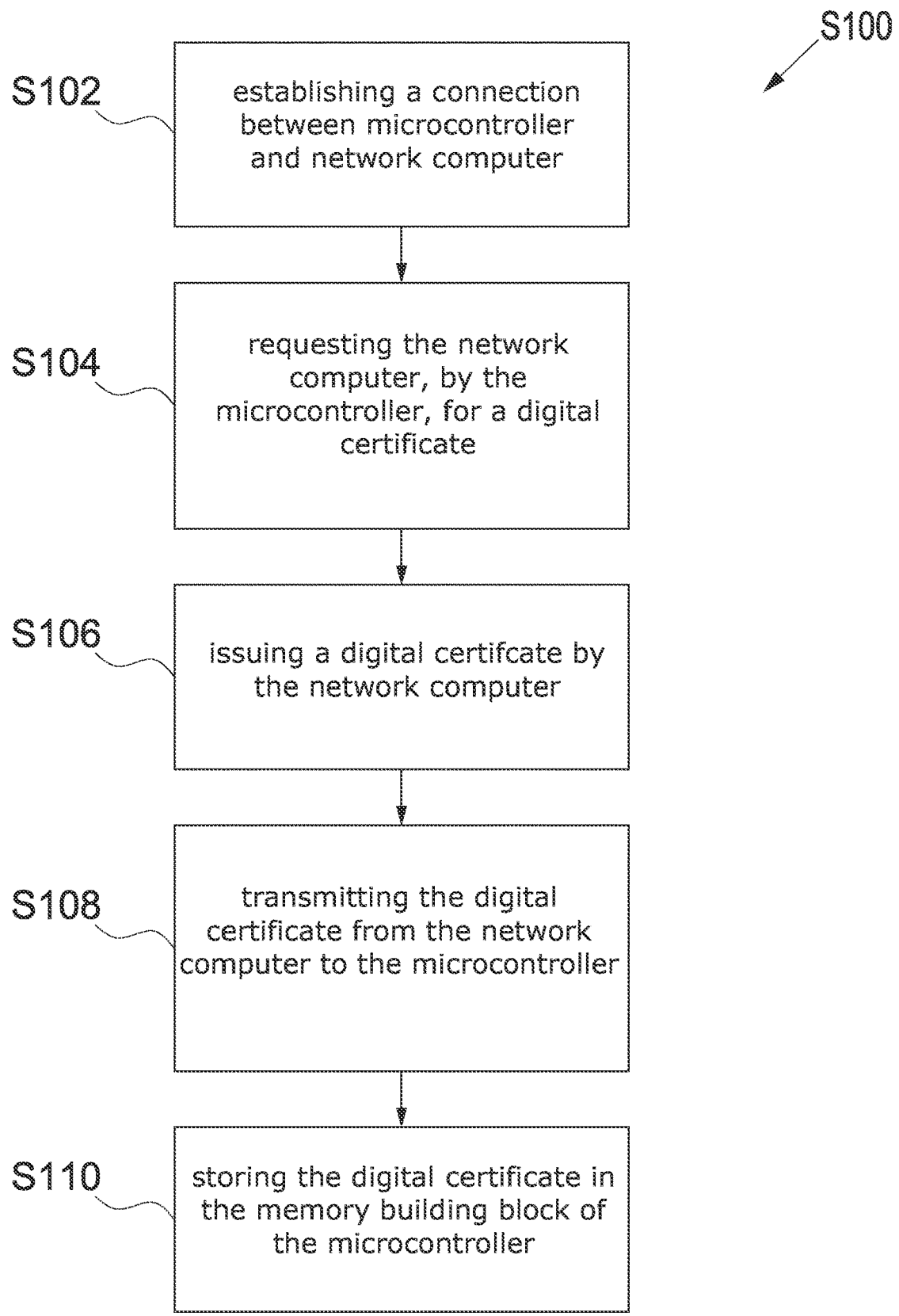
FIG. 5 shows a further flow diagram for illustrating the individual steps of initiating the microcontroller.

FIG. 5 shows the individual steps of initiation S100. First, a connection is established between microcontroller 10 and network computer 12 (step 102). Preferably, a secured connection can be established between microcontroller 10 and network computer 12. The microcontroller then requests a digital certificate from network computer 12 (step S104). According to a preferred embodiment of the disclosure, it may be provided that network computer 12 first verifies the identity of microcontroller 10. This can be done, for example, by requesting an authentication key. For example, this authentication key may have been previously generated by the microcontroller. Then, assuming successful authentication of microcontroller 10, network computer 12 may issue a digital certificate to microcontroller 10 (step S106). The digital certificate generated by network computer 12 is then transmitted to microcontroller 10 (step S108). Finally, the digital certificate is stored in memory module 16 of microcontroller 10 (step 110).

Figure 6:
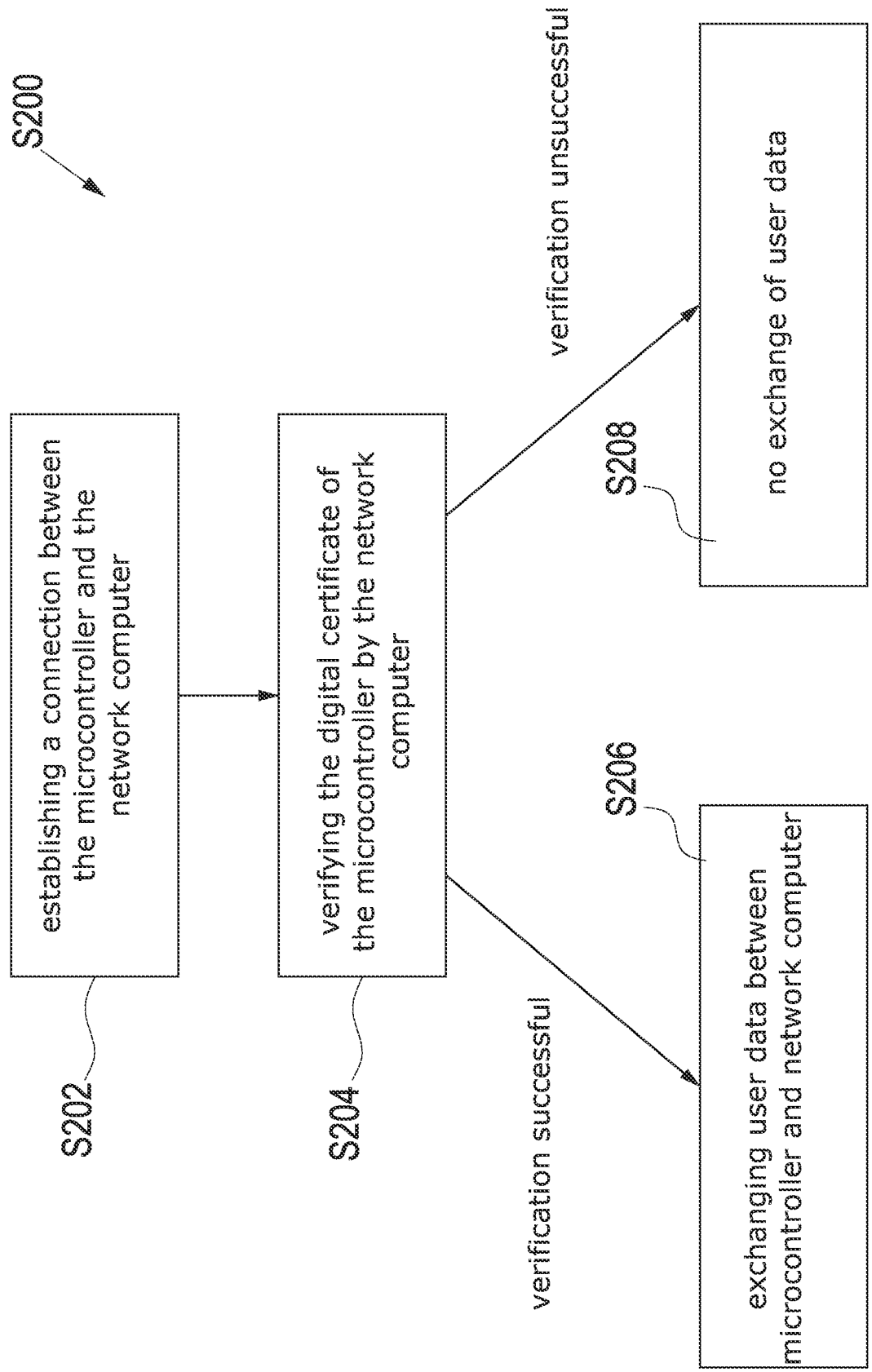
FIG. 6 shows a further flow diagram for illustrating the individual steps of exchanging user data between the microcontroller and the network computer.

FIG. 6 shows the individual steps of data exchange S200. In a first step, a connection is established between microcontroller 10 and network computer 12 (step 202). Then, network computer 12 verifies the digital certificate of microcontroller 10 (step 204). If this verification has been successful, the exchange of user data between microcontroller 10 and network computer 12 is permitted (step S206), if the verification has not been successful, the exchange of data between microcontroller 10 and network computer 12 is denied (step S208). Furthermore, it may be provided that not only network computer 12 verified the digital certificate of microcontroller 10, but also that microcontroller 10 verifies the digital certificate of network computer 12. In this way, it can be ensured that the exchange can only take placed between two authorized parties.

Figure 8:
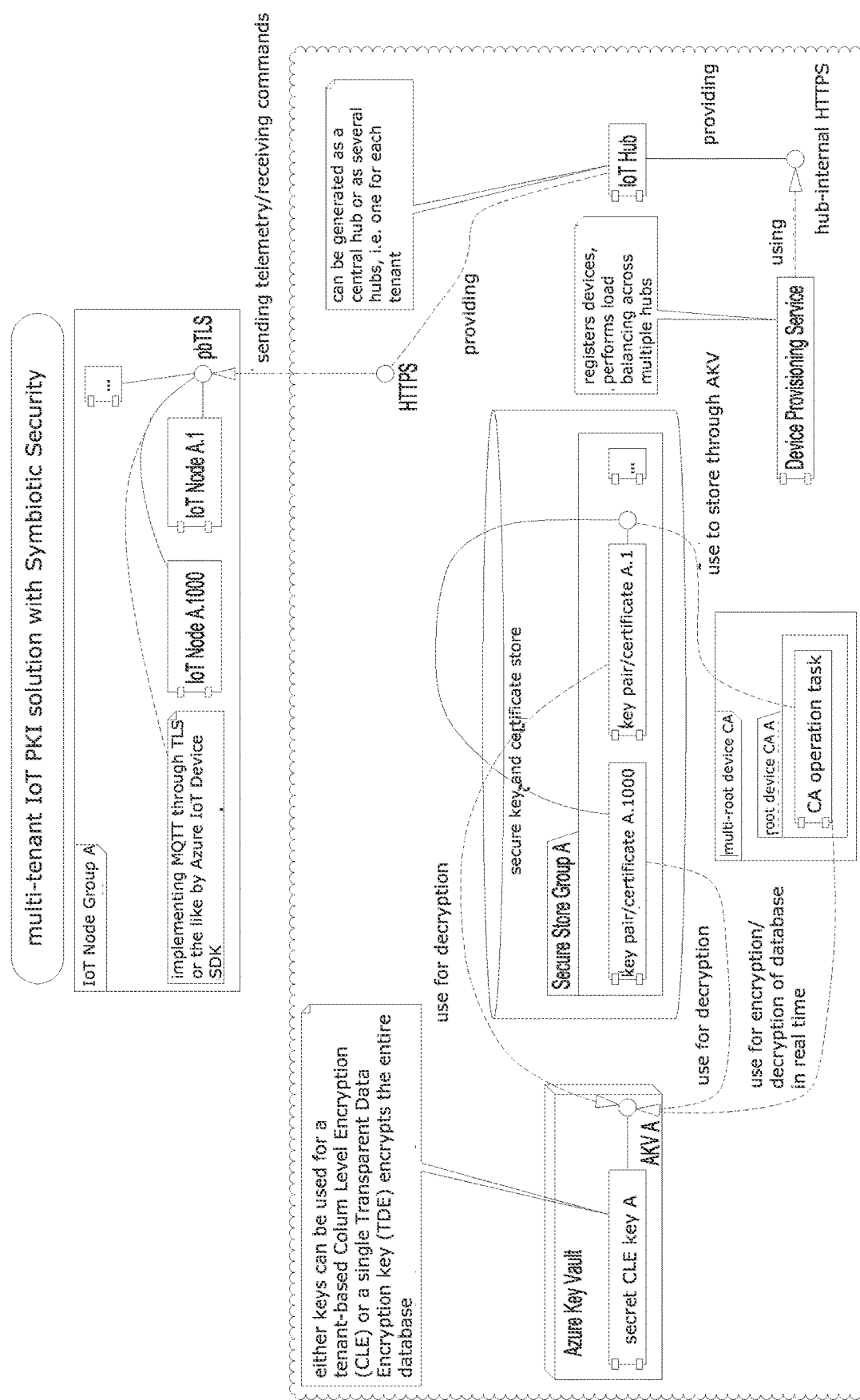
FIG. 8 shows a multi-tenant IoT PKI solution with symbiotic security.
Figure 9:
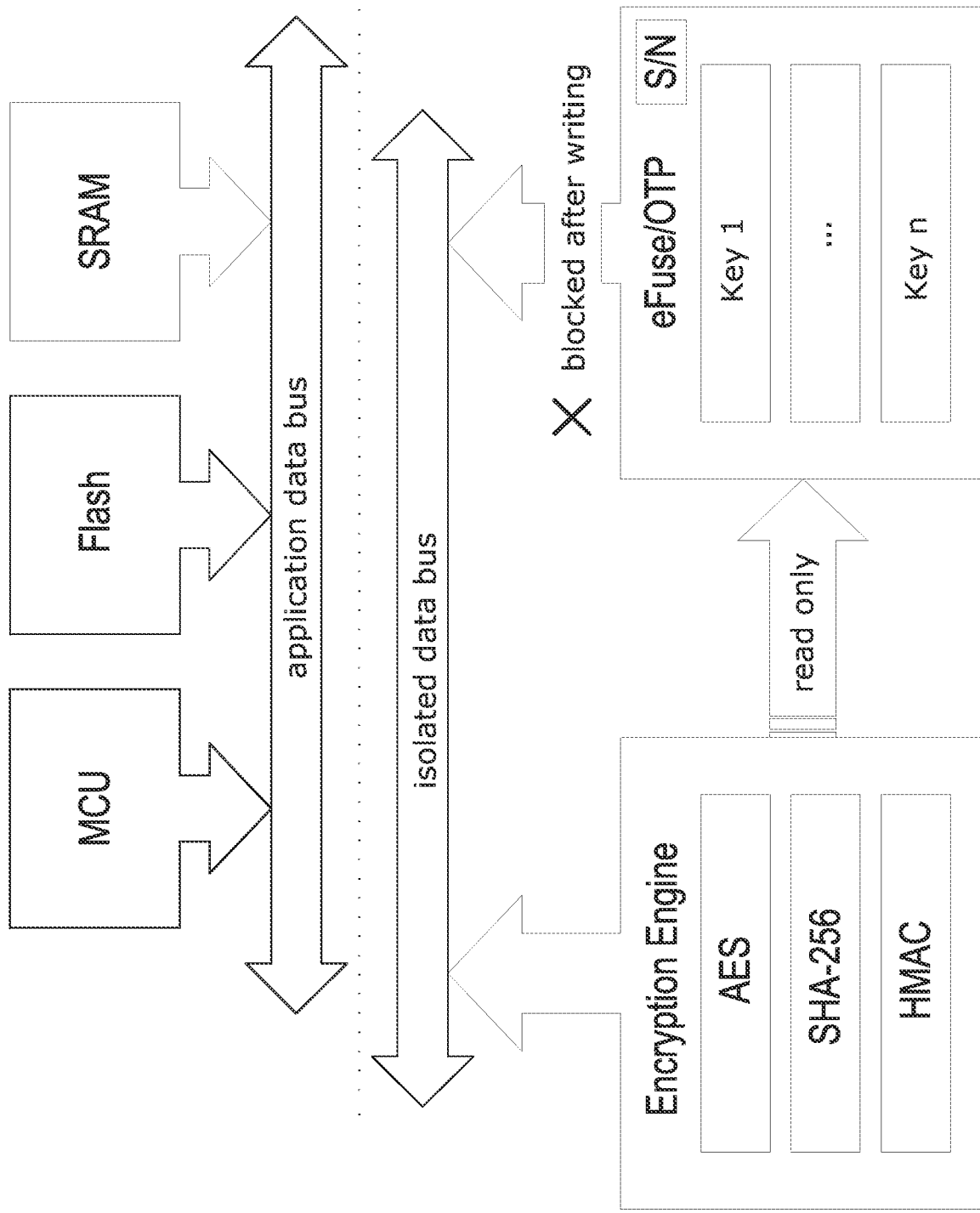
FIG. 9 shows building blocks of a hardware crypto engine.

FIG. 7 shows an intercepted Azure IoT traffic, FIG. 8 shows a multi-tenant IoT PKI solution with symbiotic security, and FIG. 9 shows building blocks of a hardware crypto engine. FIGS. 7 to 9 will be referred to in connection with the following alternative description of further aspects according to the disclosure.

To illustrate further aspects of the present disclosure, the disclosure is explained by the following alternative description.

Reference Architecture for the Initial Enrolment of IoT Devices and Target-Specific or Application-Dependent Firmware Coupling with Symbiotic Security As previously postulated, Symbiotic Security joins all essential components and entities of the "Factory of Tomorrow" into a union of co-existence where embedded devices or IoT (Internet of Things) not only just rely on intermediaries such as gateways to ensure a decent level of architectural security, but rather implement the same high standard with the help of strong cryptography (e.g. Transport Layer Security or TLS) to support its consistent use across the entire platform comprised of the Internet of Things and the Internet of Services. The latter is better known and understood in its remote and distributed form of Cloud Computing where highly available and scalable resources are aggregated to process the incoming telemetry or simply put a large amount of raw data also now commonly referred to as the "Big Data". Prior to forming this solid alliance of Symbiotic Security, IoT devices need to be shipped to their target-specific destination (e.g. customer or factory A or B) where they have to be subsequently equipped with the corresponding firmware implementing the necessary business logic A or B and therefore also have to be remotely activated in a secure fashion. The present description introduces a reference architecture based on the cumulative requirements stated above also allowing for the highest presently known level of key protection and access control. The underlying approach therefore paves the way for practical constructions of Resilient Critical Infrastructures.

I. Introduction

Secure activation of IoT devices has already been demonstrated through the previous work of the inventor to be fragile and circumstantially vulnerable (see LoRaWAN Over-the-Air Activation and Activation By Personalisation protocol flaws). This initial step is perhaps the most critical of all processes given its broad and fundamental dependency on the overall level of security of the underlying identity and access as well as key management; hence the term "Symbiotic Security" to allude to the chain of dependencies required to secure the entire architecture. Since the onboarding workflow is essentially driven and governed by the back-end infrastructure as part of the aforementioned architecture, this paper will discuss important problems and solutions focusing on two prominent infrastructure hosting environments introduced in the following sections. On top of that, the working assumption at this point is that the remote back-end only allows the strongest communication end-points with respect to mutual authentication, confidentiality through encryption and integrity control. An important note to make is that the de-facto network security standard that implements these requirements is Transport Layer Security or short TLS [1]. The inevitable dependency on TLS as well as the resulting culprit of implementing it on embedded devices is best described by the following quote: "The current reality is that we don't have many if any serious alternatives to TLS/DTLS or SSH for securing this application-level connection or route today. TLS is far from being a perfect fit for many reasons I laid out here, and not least because of the weight in footprint and compute effort of the TLS stack which is too heavy for inexpensive circuitry. SSH is a reasonable alternative from the existing popular protocol suites, but suffers from lack of a standardized session resumption gesture." [10]. More important than session resumption is the explicit trust model of SSh where public keys have to be exchanged, authorised and trusted in a one-ono-ne fashion. By contrast, with TLS the trust is implicit: if both parties in any communication trust the same Certificate Authority, they automatically trust each other which in turn greatly simplifies mutual authentication.

A. Cloud Computing and IoT Reference Platforms

Two of the most prominent examples of cloud-based computing environments to enforce this principle are AWS and Azure. AWS or Amazon Web Services became 2013 an undisputed leader in the field of Cloud Computing providers [2] at the time when Microsoft with its corresponding platform called Azure was merely classified as a "visionary". However, the general structure of most, if not all, hosting environments can be summarised by the notion of "Virtual Machines" (VM) and "Storage Area Networks" (SAN). While the former basically utilise some form of bare metal hypervisor technology to run multiple operating systems (and therefore Virtual Machines) on a single physical hardware unit, the latter aggregate all of the necessary physical storage for those Virtual Machines on a dedicated hardware stack confined in its own separate network space (hence the name Storage Area Network) where Virtual Machines can remotely connect and attach to their corresponding storage allocations better known as "Virtual Disks". At a higher level, Cloud Computing platforms usually also provide dedicated database, management and network services. Both AWS and Azure also excel in their security offerings given a variety of options with respect to the protection of data at rest through strong encryption, regional VM execution or geo-location as well as hardware-based key management. As of recently, both providers have started investing in dedicated Neural Networks models and services to support the idea and realisation of Machine Learning where predictions based on incoming raw data get more accurate over time.

1) AWS IoT: AWS offers its own IoT reference architecture [3] which essentially consists of Amazon FreeRTOS and AWS IoT Core. Amazon FreeRTOS [4] is based on the well-known FreeRTOS operating system for microcontrollers where AWSspecific software libraries are included to provide a readily available firmware or Real-Time Operating System (RTOS) for a number of qualified MCUs [5]. The connectivity with the IoT Core is established through MQTT (Message Queuing Telemetry Transport) which in turn is secured with the help of TLS. It is important to mention that AWS IoT Core only accepts two-way TLS where not only the server side (IoT Core) authenticates itself towards the client (IoT Node), but also expects the client to present his own X.509 v3 DIGITAL CERTIFICATE in return [6]. While this mandatory requirement (note: TLS client-side authentication can be optional as well) makes TLS a "paragon of virtue" from the standpoint of Identity and Access Management, it also constitutes a major organisational obstacle for the developer who is forced to set up a Certificate Authority and maintain it as a Public Key Infrastructure (PKI) to ensure that his devices can authenticate and therefore participate in the AWS IoT offering. Establishing solid PKI systems is a non-trivial task which requires sophisticated knowledge in the field of cryptographic key management as will be demonstrated in this paper. On top of that, Certificate Authorities always entail considerable management overhead demanding careful planning and execution. While AWS IoT can use certificates generated both by AWS IoT internally and by a well-known external CA, an ideal IoT environment following the basic principles of INDUSTRIE 4.0 [7] calls for a high degree of automation to enable independent Cyber Physical Systems (CPS) which according to [8] integrate physical processes and computation by employing embedded computers and networks to control the underlying physical workflows. The upper limit of AWS IoT Core with respect to PKI is the ability to register a CA under the developer's account which still does not free him from the responsibility to run a fully fledged Certificate Authority following the expected best practice.

Another important observation to make is that AWS IoT requires developers to convert certificates and the corresponding cryptographic keys to simple byte arrays or C strings prior to embedding or hard-coding them into the binary image to be executed by the MCU (see [6], p. 39). This provides little to no protection of the secret key material given that IoT Nodes or CPS are expected to operate in the field where they are potentially exposed to adversarial physical access. All presently available MCU modules qualified for the AWS IoT offering [5] are equipped with Flash and EEPROM memory which are known for their susceptibility to both invasive and non-invasive data manipulation and extraction techniques.

Regarding the overall consumption of the MCU code space, AWS is planning on releasing an Over-the-Air (OTA) update mechanism at the time of writing this description which will impose a penalty of storing two firmware images in the program memory of the module at the same time.

2) Microsoft Azure IoT: Microsoft's IoT architecture has basically the same structure as that of AWS by exposing standard communication interfaces to IoT Nodes through an IoT Hub which is the equivalent of AWS IoT Core. The general recommendation from Microsoft is to leverage REST [11] over HTTPS with the payload formatted in JavaScript Object Notation (JSON) which is human readable [12] as FIG. 7 illustrates through interception of the otherwise TLS protected traffic between an exemplary client-side application simulating an IoT device by constantly submitting telemetry data and an IoT Hub instance receiving and processing it. The data traffic interception and recording was conducted with the help of the open source interactive HTTPS proxy mitmproxy (man in the middle proxy) [13] which is available for various platforms including Docker [14] and the Windows Subsystem for Linux (WSL) [15]. The latter allows to redirect all relevant data traffic to an application (e.g. mitmproxy) running in an embedded Linux container on Windows as if that application were running on Windows directly.

Besides the IoT devices, other core components are:
1) IoT Hub: provides secure communication end-points through the consistent use of TLS/HTTPS and manages devices
2) IoT Hub Device Provisioning Service: automatically registers IoT devices with an IoT Hub, performs load balancing across multiple hubs and matches different device connections against their respective IoT solutions in a multi-tenant fashion
3) Stream Processor: rule-based downstream evaluation of data (once extracted and forwarded by IoT Hub)
4) Storage: persistent hosting of processed data with optional solid data at rest protection through strong encryption and hardware-based key management (another optional element)
5) Business Logic Integrator: integrates processed and stored data with web or generic applications implementing certain business logic B. Target Platform, Selection Criteria and Inner IoT Mechanics For our reference architecture, we have chosen Microsoft Azure as the target platform for various reasons:

Seamless integration of Microsoft products, operating systems and enterprise-level management solutions, e.g. Azure Active Directory [16].

Tight integration of well-known development tools, e.g. Microsoft Visual Studio IDE with built-in identity and access management as well as versioning system.

The ability to deploy not only Virtual Machines, but also dedicated stand-alone Web Applications and databases.

Geo-location options and support for binding applications and Virtual Machines to dedicated physical hardware units. This can be of particular interest in highly critical infrastructure-level environments which need to ensure all potential attack vectors are anticipated and alleviated. Recent examples of such a threat are the Meltdown and Spectre attacks. While Meltdown leverages vulnerabilities and flaws of CPU architectures to allow rogue applications to penetrate the barrier between the user space and the operating system (kernel) [18], Spectre aims for the isolation layer between user space applications to enforce data leakage in legitimate applications [19].

Highly scalable AZURE KEY VAULT [17] based on physical HIGH SECURITY MODULE (HSM) appliances with native key management support for Virtual Machines and databases.

Prior to using IoT devices in the field there is always the complex problem of initial deployment which "kicks in" as soon as the IoT devices based on the technology of a certain vendor have been acquired and need to be shipped to their productive environment in a subsequent step. The next section of this description will therefore deal with the question why this is a non-trivial issue and how to overcome it in a secure fashion. As far as Azure IoT is concerned, every application starts with the process of device registration (initial enrolment) upon successful authentication of either a single device or a group of those. Authentication is done through one of the two major attestation mechanisms: X.509 certificates and Trusted Platform Module (TPM). While the client-side certificate authentication is a well-known and accepted methodology as part of the TLS standard [1], the TPM attestation requires the presence of a TPM or TPM-like component (TPM can be stand-alone, integrated, virtualised through a hypervisor or software-based although the latter is less secure than a purely hardware-based alternative). TPM is basically a cryptographic processor which contains an asymmetric Endorsement Key embedded into every unit by the TPM manufacturer. The TPM attestation leverages this key to prove possession of its private part in a challenge-response protocol where the Device Provisioning Service generates a nonce, encrypts it with the TPM keys (TPM holds a hierarchy of keys at the top of which there is always the Endorsement Key), sends it back to the module and expects to get a Shared Access Signature (SAS) token signed by the nonce [22].

The opaque TPM approach to Endorsement Key creation is also one of the biggest points of criticism of the Trusted Platform: there is no guarantee that the manufacturer does not deliberately store a copy of every single key where such a central store could be compromised, otherwise accessed without the knowledge of the TPM owner or in the worst case scenario perhaps even fall prey to a nation-state or state-sponsored attacker. These angles have long been criticised by various sources including the German Federal Office for Information Security [20]. Critical vulnerabilities in such a wide-spread yet isolated and rigid technology have a devastating impact on all dependent devices as was demonstrated last year through the discovery of an erroneous handling of RSA primes in an essential cryptographic library used by TPM manufacturers. The attack described in [21] could factorise private RSA keys in 50 CPU-years on average (which can now be efficiently parallelised leveraging the very Cloud Computing platforms focused on in this description) for 2048-bit keys just by inspecting the corresponding public key.

Another way of authenticating against an IoT Hub is by using shared symmetric keys to generate or derive security tokens with a pre-defined life-time. This is basically the same approach as with the TPM-endorsed Shared Access described above, only this time the required symmetric keys are not expected to be protected by hardware. In fact, there is no recommendation as to how to solve the fundamental symmetric key exchange problem which is precisely what this description aims to address in the following sections. The token signing as such is an HMAC-SHA256 operation where the pre-shared symmetric key is used for this function [23].

On top of the native authentication mechanisms outlined above, Azure also supports hybrid and somewhat exotic patterns which can be implemented as a custom gateway to not only authenticate incoming connections but also processes them as part of the protocol logic [24]. Microsoft references the meanwhile dated RFC 4279 "Pre-Shared Key Ciphersuites for Transport Layer Security (TLS)" as a custom gateway example. The proposed standard leverages three different schemes to steer clear of certificates which require a Public Key Infrastructure in the form of a Certificate Authority that takes some effort to build and maintain:

PSK Key Exchange utilises symmetric keys shared in advance in such a way that the keys themselves are never exchanged over the network. Instead, the server only indicates or hints at the identity of his key as part of the ServerKeyExchange message. The client confirms that he has the corresponding PSK in the subsequent ClientKeyExchange message. The resulting premaster secret is then more or less a look-up of the PSK itself on either side. The actual application data is symmetrically encrypted using the right PSK.

DHE_PSK Key Exchange same as above, but instead of the static PSK the asymmetric Diffie-Hellman (DH) key exchange takes place to compute a symmetric session key. As the name suggests, this key exchange is also ephemeral which means that the DH parameters are dynamically generated for every new session. The latter ensures Forward Secrecy, i.e. even if all the previous sessions are compromised or broken, the current or next one will not be affected. However, DH is a non-authenticated key-agreement protocol which makes it vulnerable to active attacks, e.g. Man-in-the-Middle.

RSA_PSK Key Exchange: While the first two options omit all certificate related messages in the otherwise nearly the same TLS handshake, RSA_PSK does use the server-side certificate. The actual benefit is the public server key bound to its certificate which is used by the client to encrypt a message to the server containing a 46-byte random value. The latter is concatenated with the PSK to form the premaster secret. Much like with PSK there is no Forward Secrecy with this option. An added value is the 46-byte random string which can be interpreted as a salt to a potentially weak PSK (e.g. human-chosen) which would otherwise be susceptible to a dictionary attack.

In summary, none of the modes above truly fulfils all essential security goals, not even the RSA_PSK option which gives much leeway as far as the implementation is concerned based on the observation that the main goal of the suggested standard is to avoid using certificates which in turn suggests that there is no PKI in place. Consequently, most implementations would resort to using self-signed certificates at this point thereby completely undermining strong authentication. To make things worse, the question as to how the PSK is shared between the parties in the first place is beyond the scope of the RFC which does not provide a consistent practical solution for the issue at hand.

As the final step of the overall workflow, IoT networks need to be able to complete the process of device registration and configuration by implementing the Device Provisioning Service Client Software Development Kit (SDK) [25]. This software communicates with the Device Provisioning Service for the initial authentication based on one of the attestation schemes explained above. After that, the device is registered with the designated IoT Hub at which point it can retrieve its basic configuration and start supplying telemetry data.

C. What is Missing

As outlined above, Microsoft has provided a comprehensive framework for IoT applications yet not without limitations: the overall workflow does not commence until after an IoT Node manages to pass its attestation and gets registered with the corresponding IoT Hub. The remaining functional air gap is situated between the manufacturing process of the IoT Nodes, their deployment and the eventual device registration in the cloud. Microsoft does distinguish between the manufacturing and the cloud setup step, yet "The Device Provisioning Service does not introduce a new step in the manufacturing process; rather, it ties into the existing step that installs the initial software and (ideally) the HSM on the device." [26]. Yet what is this existing step, how to standardise it and most importantly how to introduce HSM-like capabilities into resource constrained embedded devices? HSM-like features are certainly required when it comes to reaching the highest level of protection of private keys specifically in the context of certificate-based authentication. Microsoft therefore assesses the strength of the certificate-based approach as follows: "The overall result is an optimal supply chain with built-in accountability through use of cryptographic chain of trust." [27].

II. PKI-Based IoT Approach or IoT Root Certificate Authority Platform as a Service (PaaS)

A. Connecting the Dots in the Cloud

As a consequence of the air gap observed in the previous section, this description introduces a reference architecture based on X.509 root certificates where the underlying PKI exclusively leverages existing Azure Cloud components while transferring control and responsibility away from the manufacturer towards the customer or user of the resulting IoT application. As of the time of writing this description, Azure does not provide a native Certificate Authority (CA) service. A Windows CA can therefore exist either as a stand-alone host or as an Active Directory Certificate Service (ADCS) which is part of an Active Directory as such where an ADCS is always the only authoritative Enterprise Root CA. To make things worse, the single most important requirement and best practice for professional-grade CA operations to create and keep all important keys inside a hardware-based key management system or HSM is out of reach in this situation given that Azure Key Vault (Microsoft's internal remote HSM service) does not support ADCS. For the sake of completeness, AKV does provide an option to create hardware-protected certificates, but it only does so in conjunction with several well-known Certificate Authorities partnered with Key Vault [28]. Consequently, it is impossible to build a solidly isolated CA with the proper and expected HSM endorsement from the presently available Azure building blocks.

The general idea of the concept in question is as follows: The root CA must generate its root key inside AKV in order to implement the usual high-level best practice. Given the aforementioned limitations, all PKI operations would need to be outsourced and delegated into a stand-alone Virtual Machine (VM) for the operation of a multi-tenant-capable root CA that would both secure its hard disk through AKV and directly access the encrypted database to store key pairs and certificates there. Eventually, the middleware web application would at first instruct this VM to enrol an IoT device on its behalf and fetch both the key pair and the corresponding certificate from that database being the only other component entitled to access the AKV partition with the database key inside. Given the nature of this application, all sensitive data would be handled by it in a purely transient manner, i.e. no key material will be persisted or stored anywhere outside the encrypted database.

The whole package consisting of the signed certificate and the corresponding key pair would then be delivered back to the IoT device over a secure and trusted channel at which point the device can start working with it until the next automatic key and certificate rollover based on the same workflow. Another strong argument for a secure and persistent certificate store is the potential resilience and general connectivity issue on the client side resulting in the observation that the entire certificate and key management life cycle is best handled in a central middleware application as part of the overall cloud-based solution. As such, all key pair and certificate generation requests would be managed by said application and recorded inside an AKV-secured MSSQL database. This way, every IoT device or every IoT node could continue polling the PKI application until it has successfully received a copy of its current certificate alongside the corresponding key pair. Thus, even if the transmission were to be suddenly interrupted, the valuable key pair and certificate would not be lost. The diagram in FIG. 8 depicts all essential components of the reference architecture alongside their roles, important interfaces they expose as well as the resulting interactions.

B. "Fill the Air Gap" or Secure Remote Initial Enrolment and Target-specific Firmware Upload The following algorithm 1 exhibits the process of initial certificate enrolment paired with the firmware deployment concluded by device registration described in algorithm 2. The workflow comprised of these algorithms can be summarized as follows. At the beginning, all IoT modules (e.g. sS2E [29], [30]) will be shipped with only the bootloader inside. As part of the productisation process, they are supposed to reach out to the Enrolment Application (see alg. 1, line 6) to fetch the corresponding firmware (could be a standard-issue firmware or a bespoke customer solution). Prior to doing so an SRP-based [31] communication will help with the authentication at which point an encrypted channel will be established between the parties (see 6, line 22). SRP stands for Secure Remote Password protocol and constitutes one of the strongest symmetric authentication and data in transit protection schemes by implementing an interactive zero-knowledge proof of the possession of a secret element, e.g. password or cryptographic key. Applied in a correct manner, which for example stands and falls with an appropriate implementation of SRP inside the bootloader (see next section), it can overcome the usual shortcomings of symmetric authentication and key exchange mechanisms. The symmetric requirement is immensely important in this context due to the fact that Azure does not provide any solution whatsoever for the initial enrolment or a solid PKI in general. Hence the need to substitute the nonexistent certificates which would otherwise need to be self-signed (i.e. without any trust anchor at all) and pre-deployed in an additional preliminary step involving the device supplier or manufacturer.

Subsequently, the Enrolment Application requests a certificate on behalf of the node and populates it back to the device once completed (1, line 10 ff). Ultimately, the IoT node installs both the firmware and the certificate (1, line 4) at which point it can reach out to the IoT Hub in an authenticated manner in order to complete its registration and pick up regular operations shortly thereafter (see alg. 2).

C. Requirements for Symbiotic Security

The initial enrolment workflow laid out by algorithm 1 in pseudo-code notation is dependent on the procedure in line 22 which implements the Secure Remote Password (SRP) protocol as the most important building block of the solution at hand. For the sake of briefness and coherence of the details essential to this paper, suffice it to say that SRP leverages an ephemeral Diffie-Hellman-like scheme with the only two fixed parameters being the client's password and the corresponding verifier retained by the server which in turn is derived from the password using the strength of the Discrete Logarithm Problem (DLP). In addition to that, SRP refrains from using asymmetric digital signatures to ensure the authenticity of the communication partners (which is what Diffie-Hellman cannot do on its own). The latter not only makes SRP faster, it also makes it a perfect fit for the initiation of secure communication in a pre-certificate or pre-PKI environment. For more on the cryptographic details of the protocol, refer to its full specification [31].

However, even with SRP there is another essential problem to be solved in this particular scenario. SRP usually secures interactive logins where at the time of the user registration the server computes the verifier from the entered and salted password and only keeps the user identity, the salt as well as the verifier in its internal database. Given a certain level of automation though, said verifier somehow needs to find its way into the server's database without being exposed to potential adversaries (see algorithm 3). The reason for keeping the verifier secret is the password as the potential weakest link prone to the usual effective attacks, e.g. the dictionary attack. The latter utilises the observation that most passwords are poorly chosen given their (even partial) construction based on words and language elements (hence the name dictionary attack). This allows a far-reaching level of pre-computation at which point brute force becomes a progression of fast (and parallelised) guesses that can break moderately complex yet susceptible passwords in a matter of minutes. To that end, an effective dictionary attack against a password based on its exposed verifier works as follows:

$$x = H(s, p) \quad (1)$$

$$v \equiv g^x \mod n \quad (2)$$

$$x' = H(s, p') \quad (3)$$

$$v' \equiv g^{x'} \mod n \quad (4)$$

$$v' \stackrel{?}{=} v \begin{cases} \text{yes:} & \text{successful guess} \quad (5a) \\ \text{no:} & \text{wrong guess, continue} \quad (5b) \end{cases}$$

(1) shows how SRP generates the private key based on the salt s, password p and a hash function H(). (2) uses DLP (see above) to compute the verifier. An adversary with access to s and v can now start guessing passwords p' to produce the corresponding x' and v' (see (3) and (4)). A simple comparison of v' and the known v reveals the original password if the guess was successful.

This attack proves that all Critical Security Parameters (CSP) must be secured at rest utilising the best level of protection which is (as previously noted) provided by hardware-based key management systems such as AKV. What makes this approach symbiotically secure is the observation and requirement that starting with the IoT Node itself no critical or secret information is exposed. Algorithm 3 outlines how exactly this can be achieved: every device generates and persistently stores in its secure key store a unique symmetric key. Instead of revealing the latter for direct computations, an intermediary software utility connects to the module and instructs it to generate its own verifier according to (2). The resulting data consisting of the verifier, salt and node identity is submitted to the enrolment web service via an authenticated session. Once all of this has been securely written into the cloud database (which only happens after the preliminary authentication through the local utility without exposing the database externally), the utility instructs the bootloader to invoke the SRP protocol with said parameters. The subsequent algorithms 1 and 2 complete the overall workflow at which point every node receives its own firmware and certificate. In summary, the bootstrap authentication and key exchange happens symmetrically to overcome the lack of certificates at this point, the local node programming utility (required for 3) leverages interactive user authentication (followed by authorisation based on the user role) to submit CSPs to an HTTPS Web Service and to avoid embedding any CSPs into the binary application itself (e.g. certificate plus private key) for authentication. Instead of enclosing secrets, the programming utility could additionally benefit from certificate or key pinning whereby the current public key used by the aforementioned Web Service is explicitly trusted instead of or in addition to the usual chain of trust emanated through the corresponding Certificate Authority. Last, but not least, the individual password (here: secret node key) required for the verifier and SRP session is never exposed.

To ensure the password or symmetric key never leaves the secure confines of the IoT node, the following requirements pave the way for an effective construction of HSM or SmartCard like hardware structures to complement the idea of symbiotic security where every single component out of the whole architecture contributes to the overall level of security to the best of its respective abilities. As depicted in FIG. 3, a reference hardware crypto engine used to produce the verifier as well as to perform SRP would ideally be completely isolated from the user application (and therefore the MCU, Flash and SRAM). The key store as such would be implemented with the help of the eFuse or OTP (One Time Programmable) technology which cannot be altered once a certain number of cryptographic keys have been written into it. The Encryption Engine would eventually be the only circuit to read this memory unit so that all cryptographic operations would then be contained within the engine—much like with the HSM or SmartCard technology. For critical applications and customers, the manufacturer could ship such modules with an empty key store or one that is partially pre-defined with a unique randomly generated key which could then be dedicated to the protection (i.e. encryption) of the Flash memory or another key to verify the integrity of the firmware image through the HMAC function for instance. This approach would also circumvent any criticism that could otherwise be levelled at platforms of this kind (see the notes on TPM further above).

D. Future Work

To contribute to the overall idea of Symbiotic Security, our next article will show how resource-constrained IoT systems can implement higher security protocols such as TLS to support the PKI idea outlined in this paper and which development and optimisation techniques can increase computational speed and efficiency.

Algorithm 1 Initial Enrolment in Secure Factory

| | |
|---|---|
| 1: | for i ← 1 to n = delivered modules do |
| 2: | IoT_Node :: Deploy and establish connectivity; |
| 3: | (MatchingFirmware,CertkeyPair) ← |
| | ↪ENROLMENTVM(NodeSRPAuthParams); |
| 4: | IoT_Node :: Install MatchingFireware, write Cert to memory, write KeyPair into secure memory; |
| 5: | end for |
| 6: | function ENROLMENTVM(SRPParams) |
| 7: | AKV SessionID ← |
| | ↪AZURE.KEYVAULT(NodeSRPAuthParams, KeyID); |
| 8: | Look up NodeSRPAuthParams.NodeID, NodeSRPAuthParams.Salt and NodeSRPAuthParams.Verifier in SecureStorage; |
| 9: | SRP(NodeSRPAuthParams); |
| 10: | CA_VM)NodeSRPAuthParams.NodeID, AKVSessionID); |
| 11: | Open SecureStorage using AKV SessionID; |
| 12: | CertKeyPair ← |
| | ↪(SecureStorage.NodeID,sk, SecureStorage.NodeID.pk, SecureStorage.NodeID.NodeCert); |
| 13: | Matching Firmware ← |
| | ↪SecureStorage. NodeID.Fireware; |
| 14: | IoT_HUB(NodeID, RootCACert, NodeCert); |
| 15: | return encSecureChannelSessionKey( |
| | ↪MatchingFirmware, CertKeyPair); |
| 16: | end function |
| 17: | function AZUREKEYVAULT(AuthPariams, KeyID) |
| 18: | Authenticate AuthParams: |
| 19: | Open key vault KeyID; |
| 20: | return SessionID); |
| 21: | end function |
| 22: | function SRP(NodeSRPAuthParams) ▷Secure Remote Password Protocol |
| 23: | Do SRP using NodesSRPAuthParams; |
| 24: | return SuccessFlag. SecureChannelSessionKey; |
| 25: | end function |
| 26: | procedure CA_VM(NodeID, AKVSessionID) ▷ Certificate Authority |
| 27: | Generate key pair (NodeID.sk, NodeID.pk); |
| 28: | Open SecureStorage using AKVSessionID; |
| 29: | SecureStorage, ← (NodeIA.sk,NodeID.pk); |
| 30: | Generate Certificate Signing Request; ▷ CSR |
| 31: | rootCASecretKey ← |
| | ↪SecureStorageCustomer[NodeID] |
| | ↪rootCASecretKey; |
| 32: | NodeCert ← (sign CSR with rootCASecretKey); |
| 33: | SecureStorage ← NodeCert; |
| 34: | Erase rootCASecretKey from memory; |
| 35: | Close SecureStorage; |
| 36: | end procedure |

Algorithm 1 Initial Enrolment in Secure Factory

| | |
|---|---|
| 37: | procedure IoT_HUB(NodeID, RootCACert, NodeCert) |
| 38: | Install and register (NodeID, RootCACert, NodeCert); |
| 39: | end procedure |

Algorithm 2 Device Registration with the Azure Cloud

Ensure: Successful initial enrolment
Require: Installed (MatchingFireware,NodeCert)

| | |
|---|---|
| 1: | Open two-way TLS channel using NodeCert; |
| 2: | DRS(RegistrationRequest, NodeCert); |
| 3: | procedure DRS(RegistrationRequest,NodeCert) ▷ Device Registration Service |
| 4: | Do device attestation using NodeCert; |
| 5: | Register device with IoT_Hub[RegistrationRequest.CustomerID]; |
| 6: | end procedure |
| 7: | Close TLS channel; |

Algorithm 3 Customer Device Bootstrap

Ensure: Internet connectivity, utility installed, IoT module attached via UART/USB, registered customer

| | |
|---|---|
| 1: | Log into EnrolmentVM_Webservice through local utility via https and username/password (admin or developer access) |
| 2: | for i ← 1 to n = delivered modules do |
| 3: | Power on module |
| 4: | NodeSRPAuthParams ← BOOTLOADERSRP(createNodeSRPAuthParams); ▷ NodeSRPAuthParams = SerialNumber, Salt, Verifier |
| 5: | SecureStorage.NodeSRPAuthParams[i] ← |
| | ↪NodesSRPAuthParams; |
| 6: | BOOTLOADERSRP9doSRP); |
| 7: | end for |

REFERENCES

[1] Network Working Group, Proposed Standard/Request for Comments, "The Transport Layer Security (TLS) Protocol Version 1.2", [Online]. Available at: https://tools.ietf.org/html/rfc5246

[2] Gartner, "Magic Quadrant for Cloud Infrastructure as a Service", 19 Aug. 2013, [Online]. Available at: https://web.archive.org/web/20130825054202/http://www.gartner.com/technology/reprints.do?id=1-1IMDMZ5&ct=130819&st=sb

[3] AWS, "AWS IoT", 2018, [Online]. Available at: https://aws.amazon.com/iot/[4]

[4] AWS, "Amazon FreeRTOS", 2018, [Online]. Available at: https://aws.amazon.com/freertos/

[5] AWS, "Getting Started with Amazon FreeRTOS", 2018, [Online]. Available at: https://aws.amazon.com/freertos/getting-started/[6]

[6] AWS, "Amazon FreeRTOS Qualification Program Developer Guide", version 1.0.0, Jul. 31, 2018, [Online]. Available at: https://d1.awsstatic.com/productmarketing/iot/Amazon-FreeRTOS-Qualification-Program-Developer-Guide-V1.0.0.pdf

[7] National Academy of Science and Engineering, "Recommendations for implementing the strategic initiative INDUSTRIE 4.0", April 2013, pp. 23, 46-47, [Online]. Available at: https://www.acatech.de/Publikation/recommendationsforimplementing-the-strategic-initiative-industrie-4-0-final-report-ofthe-industrie-4-0-working-group

[8] Lee, E. A., 2008, "Cyber Physical Systems: Design Challenges", 11th IEEE Symposium on Object Oriented Real-Time Distributed Computing (ISORC), 363-369.
[9] Sergei P. Skorobogatov, "Copy Protection in Modern Microcontrollers", 2000, [Online]. Available at: https://www.cl.cam.ac.uk/_sps32/mcu lock.html
[10] Clemens Vasters, Microsoft Developer Blog, "Service Assisted Communication for Connected Devices", Feb. 9, 2014, [Online]. Available at: https://blogs.msdn.microsoft.com/clemensv/2014/02/09/service-assisted-communication-for-connected-devices/
[11] Roy Thomas Fielding, "Architectural Styles and the Design of Network-based Software Architectures", 2000, [Online]. Available at: https://www.ics.uci.edu/_fielding/pubs/dissertation/top.htm
[12] Microsoft, Azure IoT Services Reference Architecture, 2018, [Online]. Available at: https://aka.ms/iotrefarchitecture
[13] mitmproxy, [Online]. Available at: https://mitmproxy.org/[14] Docker Public Repository, [Online]. Available at: https://hub.docker.com/r/mitmproxy/mitmproxy/[15]
[15] Microsoft, Windows Subsystem for Linux Documentation, [Online]. Available at: https://docs.microsoft.com/en-us/windows/wsl/about
[16] Microsoft, "What is Azure Active Directory?", 2018, [Online]. Available at: https://docs.microsoft.com/en-us/azure/active-directory/fundamentals/activedirectory-whatis
[17] Microsoft, "What is Azure Key Vault?", 2018, [Online]. Available at: https://docs.microsoft.com/en-us/azure/key-vault/key-vault-whatis
[18] Moritz Lipp, Michael Schwarz, Daniel Gruss, Thomas Prescher, Werner Haas and Anders Fogh, Jann Horn, Stefan Mangard, Paul Kocher, Daniel Genkin, Yuval Yarom, Mike Hamburg, "Meltdown: Reading Kernel Memory from User Space", 27th USENIX Security Symposium, 2018
[19] Moritz Lipp, Michael Schwarz, Daniel Gruss, Thomas Prescher, Werner Haas and Anders Fogh, Jann Horn, Stefan Mangard, Paul Kocher, Daniel Genkin, Yuval Yarom, Mike Hamburg, "Spectre Attacks: Exploiting Speculative Execution", 40th IEEE Symposium on Security and Privacy, 2019
[20] German Federal Office for Information Security, "Report on Microsoft Windows 8 and TPM", August 2013, [Online]. Available at: https://web.archive.org/web/20160304004000/https://www.bsi.bund.de/DE/Presse/Pressem itteilungen/Presse2013/Windows TPM PI 21082013.html
[21] Matus Nemec, Marek Sys, Petr Svenda, Dusan Klinec, Vashek Matyas, "The Return of Coppersmith's Attack: Practical Factorization of Widely Used RSA Moduli", ACM Conference on Computer and Communications Security (CCS) 2017, [Online]. Available at: https://acmccs.github.io/papers/p1631-nemecA.pdf
[22] Microsoft Azure, Nicole Berdy, "Device provisioning: Identity attestation with TPM", November 2017, [Online]. Available at: https://azure.microsoft.com/dede/blog/device-provisioning-identity-attestation-with-tpm/
[23] Microsoft Azure, "Control access to IoT Hub", July 2018, [Online]. Available at: https://docs.microsoft.com/en-us/azure/iot-hub/iot-hub-devguide-security
[24] Microsoft Azure, "Support additional protocols for IoT Hub", November 2017, [Online]. Available at: https://docs.microsoft.com/en-us/azure/iothub/iot-hub-protocol-gateway
[25] Microsoft Azure, "Understand and use Azure IoT Hub SDKs", March 2018, [Online]. Available at: https://docs.microsoft.com/en-us/azure/iot-hub/iot-hub-devguide-sdks
[26] Microsoft Azure, "Provisioning devices with Azure IoT Hub Device Provisioning Server", May 2017, [Online]. Available at: https://docs.microsoft.com/enus/azure/iot-dps/about-iot-dps
[27] Microsoft Azure, "Conceptual understanding of X.509 CA certificates in the IoT industry", September 2017, [Online]. Available at: https://docs.microsoft.com/en-us/azure/iot-hub/iot-hub-x509ca-concept
[28] Microsoft, "Get started with Key Vault certificates", 2018, [Online]. Available at: https://docs.microsoft.com/en-us/azure/sql-database/transparentdata-encryption-byok-azure-sql
[29] PointBlank Security by Steen Harbach AG, "Security for Internet-enabled Products "Made in Germany"", 2018, [Online]. Available at: https://www.pointblank.de/de/?file=files/assets/downloads/PointBlank-Security pbTLS sS2E-Module Leaflet.pdf
[30] PointBlank Security by Steen Harbach AG, "sS2E Module Manual", 2018, [Online]. Available at: https://www.pointblank.de/en/iot-security.html?file=files/assets/downloads/MS500 SS2E MODULE User Manual V1.0.pdf
[31] T. Wu, "SRP Protocol Design", 1998, [Online]. Available at: http://srp.stanford.edu/design.html

The invention claimed is:

1. A method for communication between a microcontroller and a network computer wherein the microcontroller comprises a processor, a memory module and a network module; and wherein the network computer comprises a processor, a memory module and a network module, the method comprising the following steps:
generating, by the microcontroller independent of the network computer, a first authentication key at the microcontroller;
securely registering, with the network computer, the microcontroller based on the first authentication key during an initial setup phase;
receiving, from the network computer, a digital certificate comprising a second authentication key upon successful registration;
storing the digital certificate and the second authentication key securely at rest in the memory module of the microcontroller by utilizing the first authentication key;
initiating the microcontroller, wherein initiating the microcontroller comprises the following steps:
establishing a connection between the microcontroller and the network computer;
requesting, by the microcontroller, a new digital certificate from the network computer, based on predetermined conditions including at least one of a certificate expiration, a detection of a security threat, or a change in network policies;
providing a zero-knowledge method to prove the microcontroller's knowledge of the first authentication key to the network computer when requesting the new digital certificate;
issuing a new digital certificate for the microcontroller by the network computer upon successful authentication using the first authentication key;
transmitting the new digital certificate from the network computer to the microcontroller; and
replacing the stored digital certificate in the memory module of the microcontroller with the new digital certificate and updating the second authentication key in the memory module of the microcontroller; and exchanging user data between the microcontroller and the network computer, wherein exchanging user data comprises the following steps:

establishing a connection between the microcontroller and the network computer independent of other security schemes;

verifying the new digital certificate of the microcontroller by the network computer; and exchanging user data between the microcontroller and the network computer, provided that the previous verification of the new digital certificate of the microcontroller by the network computer has been successful.

2. The method according to claim 1, wherein when establishing a connection between the microcontroller and the network computer during initiation of the microcontroller, a secured connection is established.

3. The method according to claim 1, wherein a zero-knowledge method is used when initiating the microcontroller.

4. The method according to claim 3, wherein a password-authenticated key agreement method (PAKE method) is used in the zero-knowledge method.

5. The method according to claim 1, wherein the Secure Remote Password protocol (SRP protocol) is used when initiating the microcontroller.

6. The method according to claim 1, wherein when exchanging data between the microcontroller and the network computer, an encrypted exchange is performed using the Transport Layer Security protocol (TLS protocol).

7. The method according to claim 6, wherein TLS protocol uses a two-way TLS protocol in which both the digital certificate of the microcontroller is verified by the network computer and the digital certificate of the network computer is verified by the microcontroller.

8. The method according to claim 1, wherein a firmware is additionally transferred from the network computer to the microcontroller and is installed on the microcontroller when initiating the microcontroller.

* * * * *

UNITED STATES PATENT AND TRADEMARK OFFICE
CERTIFICATE OF CORRECTION

| | | |
|---|---|---|
| PATENT NO. | : 12,170,655 B2 | Page 1 of 1 |
| APPLICATION NO. | : 17/298186 | |
| DATED | : December 17, 2024 | |
| INVENTOR(S) | : Witali Bartsch et al. | |

It is certified that error appears in the above-identified patent and that said Letters Patent is hereby corrected as shown below:

On the Title Page

Item (71), Applicant, Line 2, delete "Kleinniedsheim" and insert -- Kleinniedesheim --

Signed and Sealed this
Twenty-fifth Day of February, 2025

Coke Morgan Stewart
*Acting Director of the United States Patent and Trademark Office*